(12) United States Patent
Chang et al.

(10) Patent No.: US 6,920,510 B2
(45) Date of Patent: Jul. 19, 2005

(54) TIME SHARING A SINGLE PORT MEMORY AMONG A PLURALITY OF PORTS

(75) Inventors: Gary Chang, San Jose, CA (US); Hong-men Su, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 123 days.

(21) Appl. No.: 10/163,047

(22) Filed: Jun. 5, 2002

(65) Prior Publication Data

US 2003/0229734 A1 Dec. 11, 2003

(51) Int. Cl.$^7$ .............................. G06F 3/00; G06F 3/06; G06F 5/00
(52) U.S. Cl. .............................. 710/36; 710/2; 710/22; 710/23; 710/28; 710/33; 710/36; 710/37; 710/40; 710/45; 710/51; 710/52; 710/57; 709/212; 709/234
(58) Field of Search .............................. 710/2, 22, 23, 710/28, 33, 36, 37, 40, 45, 51, 52, 57; 709/212, 234

(56) References Cited

U.S. PATENT DOCUMENTS

| 4,414,547 | A | * | 11/1983 | Knapp et al. ............... 326/40 |
|---|---|---|---|---|
| 4,489,381 | A | * | 12/1984 | Lavallee et al. ............ 711/117 |
| 4,788,656 | A | * | 11/1988 | Sternberger ................... 710/52 |
| 4,967,398 | A | * | 10/1990 | Jamoua et al. ......... 365/230.05 |
| 5,457,681 | A | * | 10/1995 | Gaddis et al. ............... 370/402 |
| 5,933,855 | A | * | 8/1999 | Rubinstein ................... 711/200 |
| 6,044,419 | A | * | 3/2000 | Hayek et al. ................. 710/57 |
| 6,130,891 | A | * | 10/2000 | Lam et al. .................... 370/401 |
| 6,160,813 | A | * | 12/2000 | Banks et al. ................. 370/422 |
| 6,173,425 | B1 | * | 1/2001 | Knaack et al. ............... 714/718 |
| 6,393,021 | B1 | * | 5/2002 | Chow et al. ................. 370/378 |
| 6,606,691 | B2 | * | 8/2003 | Didier et al. ................ 711/151 |
| 6,779,061 | B1 | * | 8/2004 | Swindle et al. ............... 710/71 |

FOREIGN PATENT DOCUMENTS

| EP | 20255 A1 | * | 12/1980 | ........... H04Q/11/04 |
|---|---|---|---|---|
| JP | 63175964 A | * | 7/1988 | ........... G06F/15/16 |
| JP | 02257350 A | * | 10/1990 | ........... G06F/13/28 |
| JP | 04133142 A | * | 5/1992 | ........... G06F/12/00 |

* cited by examiner

Primary Examiner—Jeffrey Gaffin
Assistant Examiner—Angel L. Casiano
(74) Attorney, Agent, or Firm—Christopher P. Maiorana, P.C.

(57) ABSTRACT

An apparatus comprising a first circuit and a second circuit. The first circuit may be configured to transfer data between a plurality of first ports and a second port via a single port memory in response to one or more control signals. The second circuit may be configured to generate the one or more control signals, wherein the memory is time shared among the second port and the plurality of first ports.

23 Claims, 5 Drawing Sheets

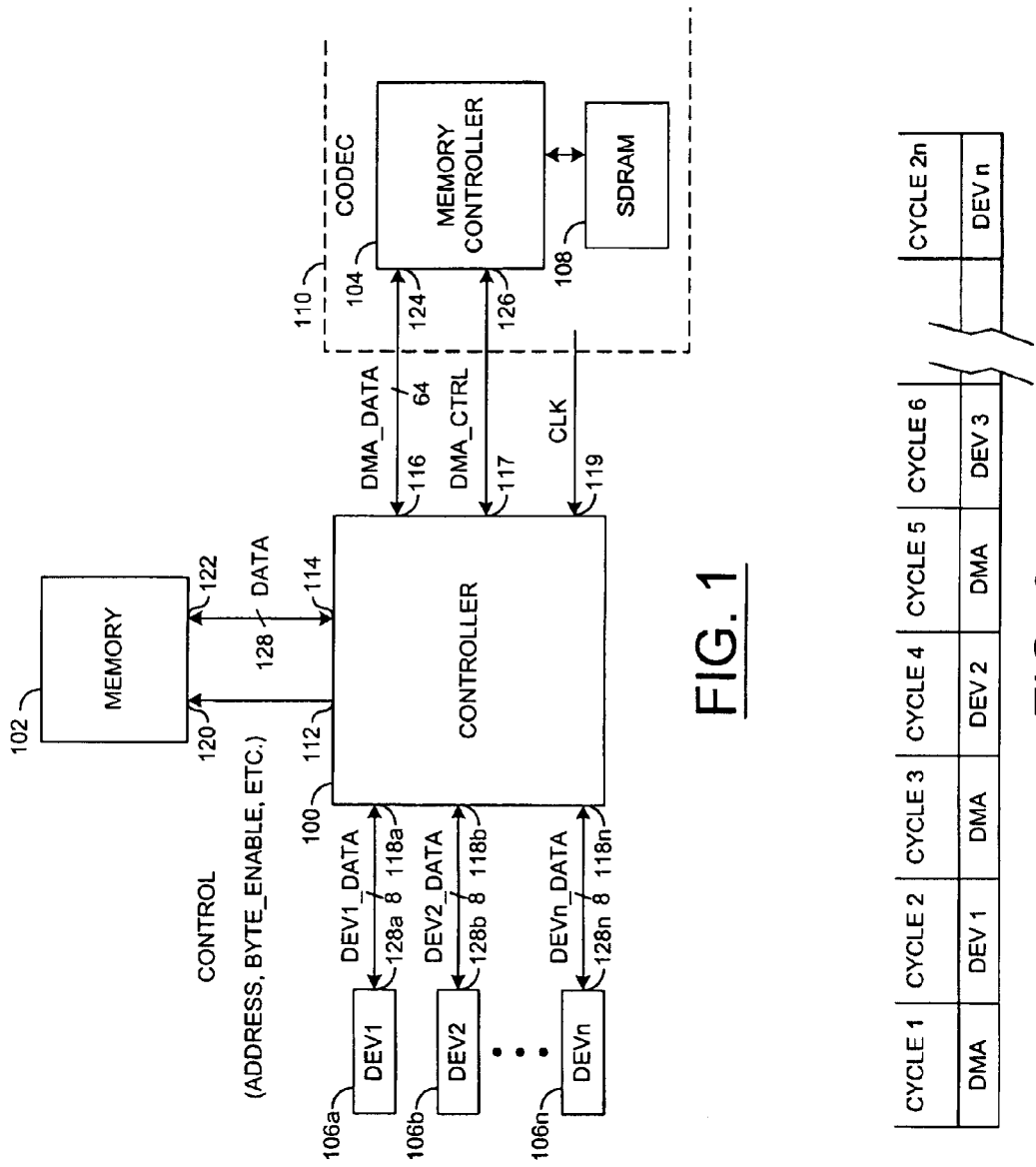

TIME SHARING A SINGLE PORT MEMORY AMONG A PLURALITY OF PORTS

FIELD OF THE INVENTION

The present invention relates to a method and/or architecture for data buffering generally and, more particularly, to a method and/or architecture for time sharing a single port memory implementing multiple FIFO data buffers.

BACKGROUND OF THE INVENTION

A conventional MPEG digital video encoder/decoder (CODEC) connects to a number input/output modules via a number of different size FIFO memories. Each of the FIFO memories connects to the conventional CODEC via a separate direct memory access (DMA) channel. The area used by the numerous memories can be large due to the overhead of address decoders, sense amplifiers and multiple read/write ports. The conventional architecture also adds complexity to the control logic of the CODEC and the procedures for testing the CODEC.

It would be desirable to connect a number of input/output modules to a MPEG digital video encoder/decoder via a single direct memory access channel.

SUMMARY OF THE INVENTION

The present invention concerns an apparatus comprising a first circuit and a second circuit. The first circuit may be configured to transfer data between a plurality of first ports and a second port via a single port memory in response to one or more control signals. The second circuit may be configured to generate the one or more control signals, wherein the memory is time shared among the second port and the plurality of first ports.

The objects, features and advantages of the present invention include providing an architecture and/or method for time sharing a single port memory among a plurality of devices that may (i) reduce the area, (ii) allow easy addition of devices to a design, (iii) allow easy removal of devices from a design, (iv) reduce the number of DMA interfaces in a design, (v) reduce number of interconnects, (vi) reduce memory management overhead and/or (vii) replace multiple RAMs of different sizes with a single RAM.

BRIEF DESCRIPTION OF THE DRAWINGS

These and other objects, features and advantages of the present invention will be apparent from the following detailed description and the appended claims and drawings in which:

FIG. 1 is a block diagram of a preferred embodiment of the present invention;

FIG. 2 is a timing diagram illustrating an example operation in accordance with a preferred embodiment of the present invention;

DETAILED DESCRIPTION OF THE PREFERRED EMBODIMENTS

Figure 3:
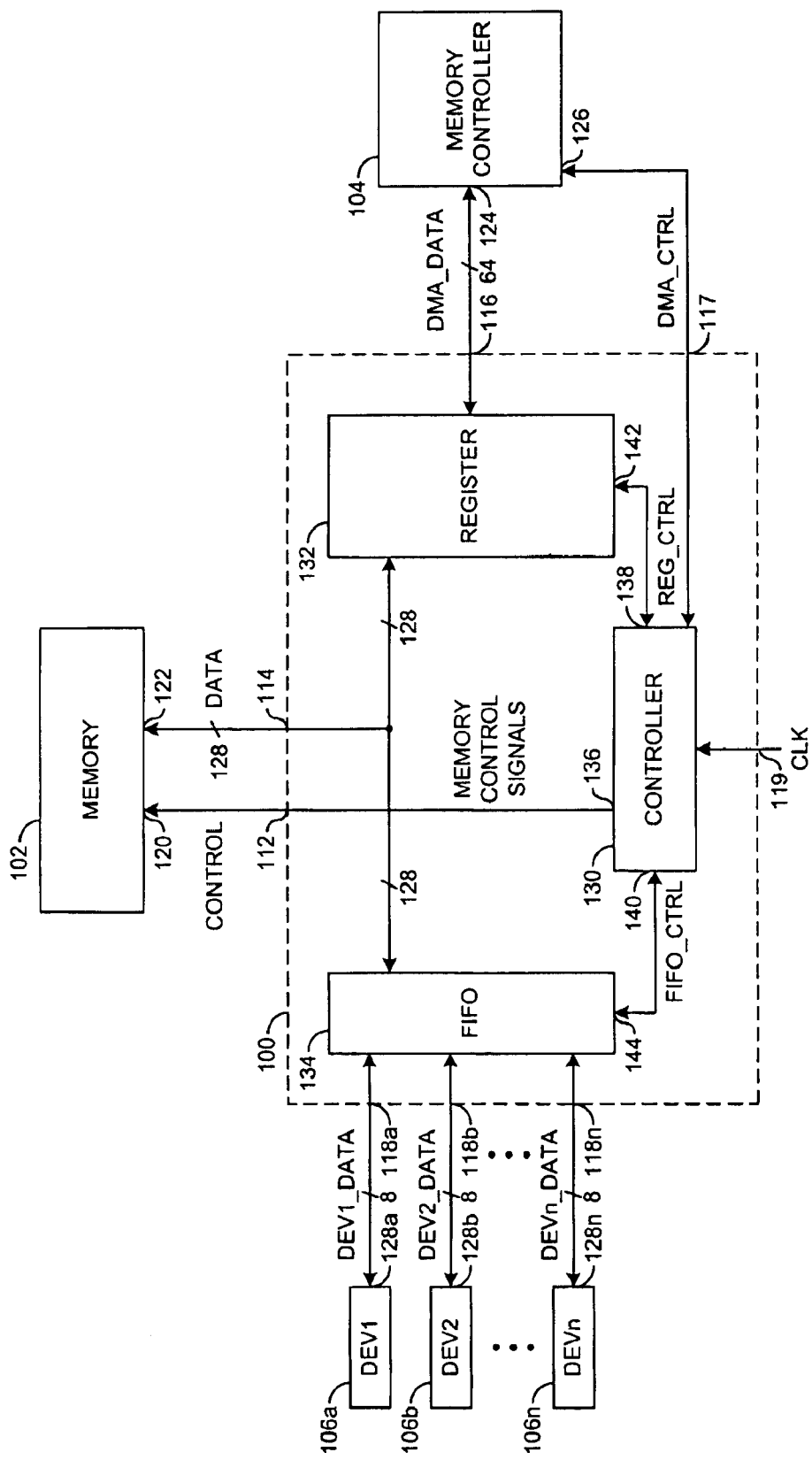
FIG. 3 is a more detailed block diagram of a preferred embodiment of the present invention.

Referring to FIG. 1, a block diagram of a circuit 100 is shown in accordance with a preferred embodiment of the present invention. The circuit 100 may be configured to time share a memory 102 with a memory controller 104 and a plurality of devices 106a–106n. The memory 102 may be implemented, in one example, as a single port random access memory. However, other types of memory may be implemented accordingly to meet the design criteria of a particular application. For example, the memory 102 may be implemented as a first-in-first-out (FIFO) memory. The memory controller 104 may be configured to provide a direct memory access channel between the circuit 100 and a memory 108 of a system 110. The system 110 may be implemented, in one example, as an encoder/decoder circuit (CODEC). The circuit 100 may be configured to transfer data between the memory controller 104 and the devices 106a–106n via the memory 102.

The circuit 100 may have an output 112, a number of input/outputs 114, 116, 117 and 118a–118n, and a clock input 119. The output 112 may present one or more memory control signals (e.g., CONTROL) to an input 120 of the memory 102. The signal(s) CONTROL may comprise, in one example, one or more address signals, one or more byte enable signals, one or more strobe signals, etc. The input/output 114 may present and receive a signal (e.g., DATA) to and from an input/output 122 of the memory 102. The signal DATA may be implemented as a multi-bit signal. In one example, the signal DATA may be 128 bits wide. However, other widths may be implemented accordingly to meet the design criteria of a particular application. The signals CONTROL and DATA may be carried on a control and a data bus, respectively, between the circuit 100 and the memory 102. The signals CONTROL and DATA may be multiplexed on one or more serial connections between the controller 100 and the memory 102.

The input/output 116 may present and/or receive a signal (e.g., DMA_DATA) to and from an input/output 124 of the circuit 104. The signal DMA_DATA may be implemented as a multi-bit signal. In one example, the signal DMA_DATA may be 64 bits wide. However, other widths may be implemented accordingly to meet the design criteria of a particular application. The input/output 117 may present and/or receive one or more signals (e.g., DMA_CTRL) to and from an input/output 126 of the circuit 104. The signal(s) DMA_CTRL may comprise a number of DMA channel control signals (e.g., DMA request signals, DMA grant signals, DMA byte enable signals, etc.)

The input/outputs 118a–118n may present and/or receive a number of signals (e.g., DEV1_DATA-DEVn_DATA) to and/or from input/outputs 128a–128n of the devices 106a–106n. The signals DEV1_DATA-DEVn_DATA may be implemented as multi-bit signals. In one example, the signals may be implemented as 8-bit wide signals. However, other widths may be implemented accordingly to meet the design criteria of a particular application. For example, the signals DEV1_DATA-DEVn_DATA may be implemented with similar widths or different widths. The devices 106a–106n may communicate with the circuit 100 via, in one example, 8-bit busses. However, busses having other widths may be implemented accordingly to meet the design criteria of a particular application. For example, each of the devices 106a–106n may communicate with the circuit 100 via similar width or different width busses. In an alternative embodiment, the signals DEV1_DATA-DEVn_DATA may be implemented as serial signals.

The circuit 100 may be configured to manage data transfers between the memory 102, the memory controller 104 and the devices 106a–106n via the respective signals DATA, DMA_DATA, and DEV1_DATA-DEVn_DATA during each cycle of a system clock (or other reference signal). In one example, a clock signal (e.g., CLK) of the system 110 may be received at the input 119 of the circuit 100. The circuit 100 may be configured to time share the memory 102, in one example, via a fixed schedule. For example, in a preferred embodiment, the DMA transfers between the circuit 100 and the controller 104 generally occur every cycle and are transferred to/from the memory 102 every two cycles. Data transfers between the circuit 100 and each of the devices 106a–106n generally occur every cycle and are transferred to/from the memory 102 in a predetermined sequence during alternate cycles from the DMA transfers. However, other time sharing schedules may be implemented accordingly to meet the design criteria of a particular application.

The memory 102 may be implemented, in one example, with a data bus width that is an integer multiple of the width of the DMA channel communicating between the circuit 100 and the memory controller 104. For example, the memory 102 may be implemented as a random access memory with a 128-bit wide data bus and one or more byte enable inputs and the DMA channel may be implemented with a 64-bit wide data bus. However, other bus ratios may be implemented accordingly to meet the design criteria of a particular application. In an alternative embodiment, the memory 102 may be implemented as, in one example, two 64-bit wide memories connected together to operate as a 128-bit wide memory.

Referring to FIG. 2, a timing diagram illustrating an example operation in accordance with a preferred embodiment of a present invention is shown. The circuit 100 may be configured to control (schedule) data transfers between the memory 102 and the memory controller 104 and the devices 106a–106n over a number of access cycles (e.g., cycle 1 to cycle 2n, where n is the number of devices). In one example, a DMA access between the memory controller 104 and the memory 102 may be scheduled to occur every two access cycles (e.g., cycle 1, cycle 3, etc.) and each of the devices 106a–106n may be given a respective single cycle access in between the DMA accesses. In general, data transferred between the circuit 100 and each of the devices 106a–106n is transferred to/from the memory 102 during a predetermined cycle. The circuit 100 may be configured such that the memory controller 104 and the devices 106a–106n can transfer data to the circuit 100 during every cycle.

Referring to FIG. 3, a more detailed block diagram of the circuit 100 is shown. In one embodiment, the circuit 100 may comprise a circuit 130, a circuit 132 and a circuit 134. The circuit 130 may be implemented as a controller circuit. The circuit 132 may be implemented as a register circuit. The circuit 134 may be implemented as a first-in-first-out (FIFO) storage element. The controller circuit 130 may have, in one example, an output 136, an input/output 138 and an input/output 140. The output 136 may be configured to present the signal CONTROL. The input/output 138 may present/receive one or more control and/or management signals (e.g., REG_CTRL) to/from an input/output 142 of the circuit 132. The input/output 140 may present/receive one or more control and/or management signals (e.g., FIFO_CTRL) to/from an input/output 144 of the circuit 134. The circuit 130 may be configured to generate the signals CONTROL, REG_CTRL and FIFO_CTRL in response to one or more of the signals CLK and DMA_CTRL.

In a first mode, the circuit 132 may be configured to transfer data received via the signal DMA_DATA from the memory controller 104 to the memory 102 via the signal DATA in response to one or more signals received from the circuit 130. In a second mode, the circuit 132 may be configured to transfer data received via the signal DATA from the memory 102 to the memory controller 104 via the signal DMA_DATA in response to one or more signals received from the circuit 130. The circuit 132 may be configured such that the memory controller 104 may perform multiple writes or reads for each single read or write of the memory 102.

In a first mode, the circuit 134 may be configured to transfer data received via each of the signals DEV1_DATA-DEVn_DATA from the devices 106a–106n to the memory 102 via the signal DATA in response to one or more signals received from the circuit 130. In a second mode, the circuit 134 may be configured to transfer data received via the signal DATA from the memory 102 to each of the devices 106a–106n via each of the signals DEV1_DATA-DEVn_DATA in response to the one or more signals received from the circuit 130. The circuit 134 may be configured such that (i) each of the devices 106a–106n may transfer data to and/or from the circuit 134 during every cycle and (ii) the data presented to and/or received from each of the devices 106a–106n over multiple cycles may be transferred between the memory 102 and the circuit 134 during a respective single cycle.

Figure 4:
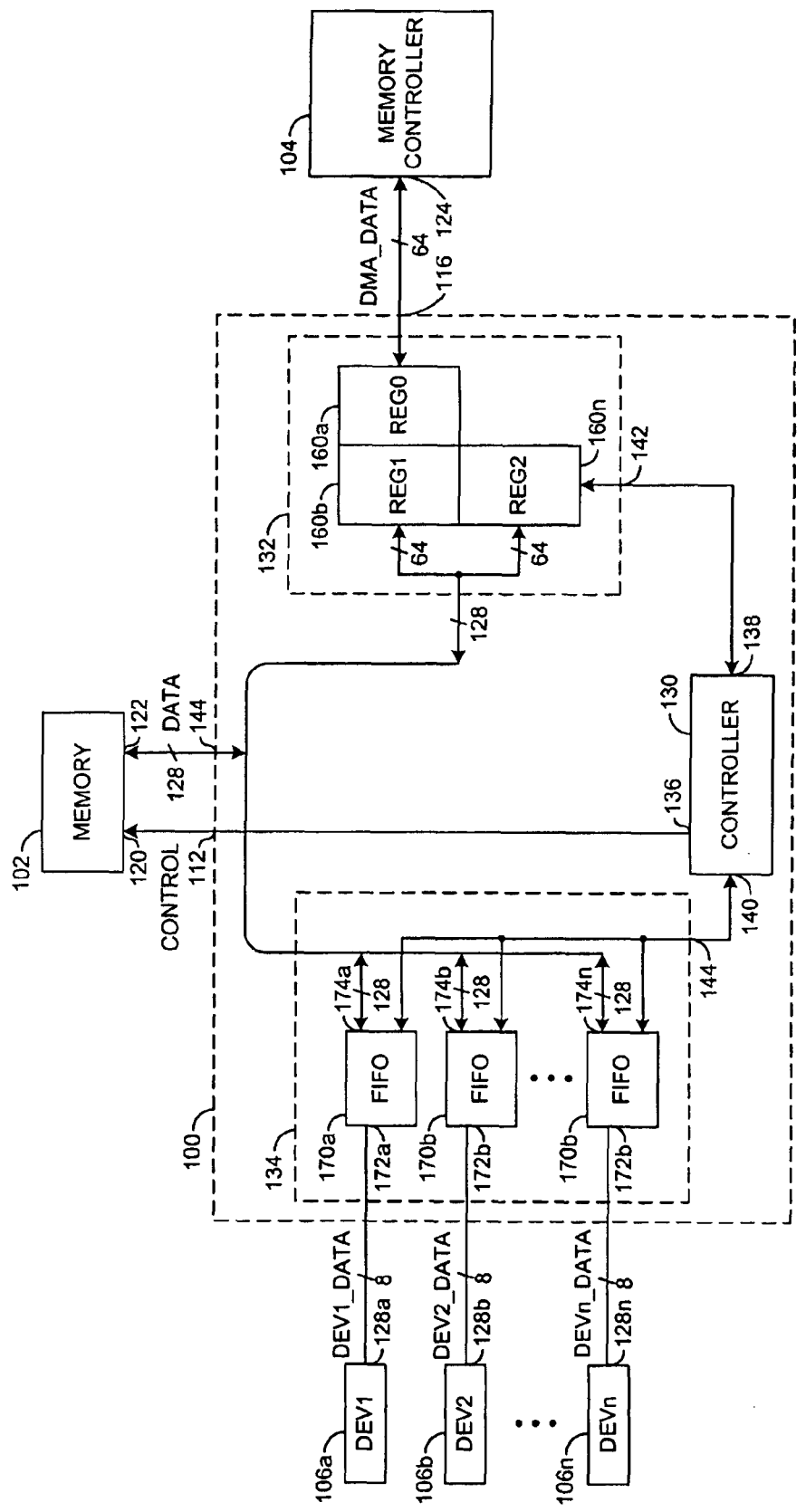
FIG. 4 is a more detailed block diagram of another preferred embodiment of the present invention.

Referring to FIG. 4, a more detailed block diagram of the circuit 132 and 134 of FIG. 3 is shown. The circuit 132 may comprise a number of registers (or latches) 160a–160n. In one example, the circuit 132 may be implemented with three registers 160a, 160b and 160n. However, other numbers of registers may be implemented accordingly depending on a ratio of the data width of the memory 102 and the data width of the memory controller 104. For example, n+1 registers may be implemented when the ratio of the memory data bus width to the DMA data width is n:1. Each of the registers 160a–160n is generally implemented with a width similar to the width of the DMA channel between the circuit 100 and the memory controller 104. The registers may be configured such that data may be transferred between the memory controller 104 and one of the registers while data is transferred between the other registers and the memory 102. In the example of three registers, data may be transferred between the memory controller 104 and a single register (e.g., the register 160a) while data is transferred between the memory 102 and the two other registers (e.g., the registers 160b–160n).

The FIFO 134 may be implemented, in one example, as a plurality of FIFOs 170a–170n. Each of the FIFOs 170a–170n may be configured to communicate with a respective one of the devices 106a–106n. The FIFOS 170a–170n may have an input/output port 172a–172n having a width similar to the data width of the respective device and an input/output port 174a–174n having a width similar to the data width of the memory 102. In one example, the ports 172a–174n may be implemented as 8-bit wide ports and the ports 174a–174n may be implemented as 128-bit wide ports. However, other width ports may be implemented accordingly to meet the design criteria of a particular application.

The FIFOs 170a–170n may be configured to provide sufficient storage to hold an amount of data that may be transferred to/from the devices 106a–106n between accesses to the memory 102. In general, the depth of the FIFOs 170a–170n may be determined based on the number and/or data rates of the devices 106a–106n sharing the memory 102. In one example, when the number of devices sharing the memory 102 is seven, the data width of the devices is 8 bits and the data width of the memory 102 is 128 bits, the FIFOs 170a–170n may be implemented as 16 bytes deep. The controller 130 is generally configured to determine the number of bytes within each of the FIFOs 170a–170n and to assert appropriate byte enable signal(s) to the memory 102 accordingly. In general, the address in the memory 102 to which data is written or from which data is read for each of the FIFOs 170a–170n is incremented when an entire data width of the memory 102 has been transferred (e.g., 128-bits has been read or written).

Figure 5:
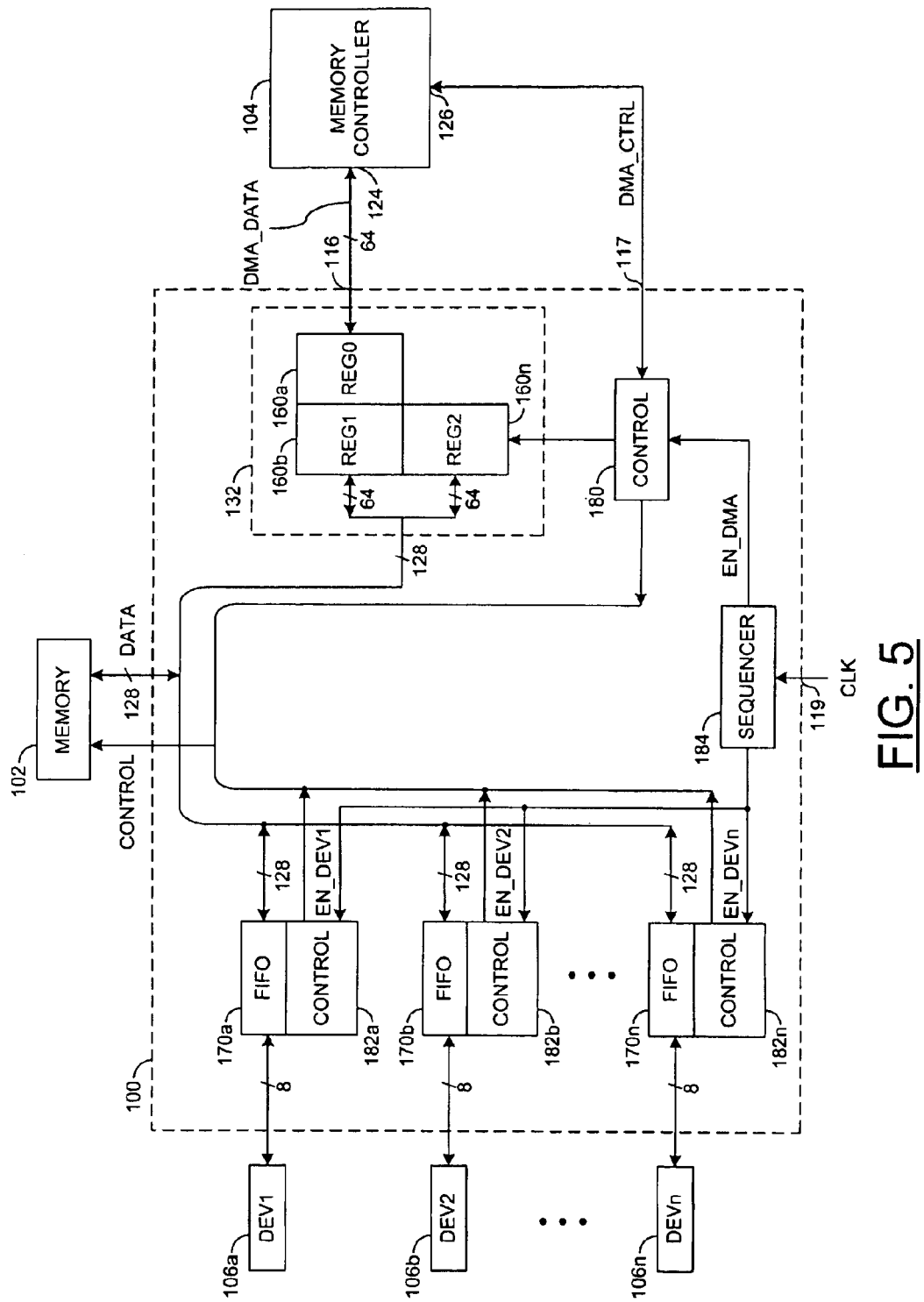
FIG. 5 is a more detailed block diagram of still another preferred embodiment of the present invention.

Referring to FIG. 5, a more detailed block diagram of a circuit 100 in accordance with a preferred embodiment of the present invention is shown. The controller 130 (described in connection with FIG. 4) may comprise, in one example, a control circuit 180, a number of control circuits 182a–182n and a sequencer 184. The control circuit 180 may be configured to control a transfer of data between the memory 102 and the circuit 132 in response to a control signal (e.g., EN_DMA) and the signals DMA_CTRL. Each of the control circuits 182a–182n may be associated with a respective one of the FIFOs 170a–170n. Each of the control circuits 182a–182n may be configured to control a transfer of data between the memory 102 and the respective FIFO 170a–170n in response to a respective control signal (e.g., EN_DEV1-EN_DEVn). The sequencer 184 may be configured to generate the signals EN_DMA and EN_DEV1-EN_DEVn in response to the signal CLK. The signals EN_DMA and EN_DEV1-EN_DEVn are generally generated according to a predetermined schedule. The schedule may be implemented to provide equal access time between each of the devices 106a–106n and the memory controller 104.

Because each FIFO 170a–170n may be implemented with a different data width and the status of each FIFO 170a–170n may not always be full when a respective access time arrives, the circuits 182a–182n are generally configured to write to appropriate portions of a location in the single port memory 102. For example, each of the individual controllers 182a–182n may be configured to determine the amount of data in the respective FIFOs 170a–170n and to assert appropriate byte enable signals and address signals to the memory 102 in order to transfer the contents of each of the FIFOs 170a–170n to or from a respective memory location of the memory 102.

During an example read cycle, the incoming data is generally written into a FIFO (e.g., 170i). The corresponding FIFO controller (e.g., 182i) generally writes the data to the memory 102 in response to the respective control signal EN_DEV1 from the sequencer. When the data in the memory 102 reaches a predetermined threshold, the control circuit 180 may be configured to generate a DMA request to the memory controller 104. After the circuit 180 receives a DMA grant from the memory controller 104, the data in the memory 102 is generally transferred to the memory controller 104 via the circuit 132.

During an example write cycle, the circuit 180 may be configured to generate a DMA request to the memory controller 104. The memory controller 104 generally sends a DMA grant to the circuit 180 and the data is generally transferred to the memory 102 via circuit 132. The FIFO controller (e.g., 182i) generally fetches the data from the memory 102 and sends the data to the FIFO 170i. The data is generally read by the device 106i from the FIFO 170i.

Figure 6:
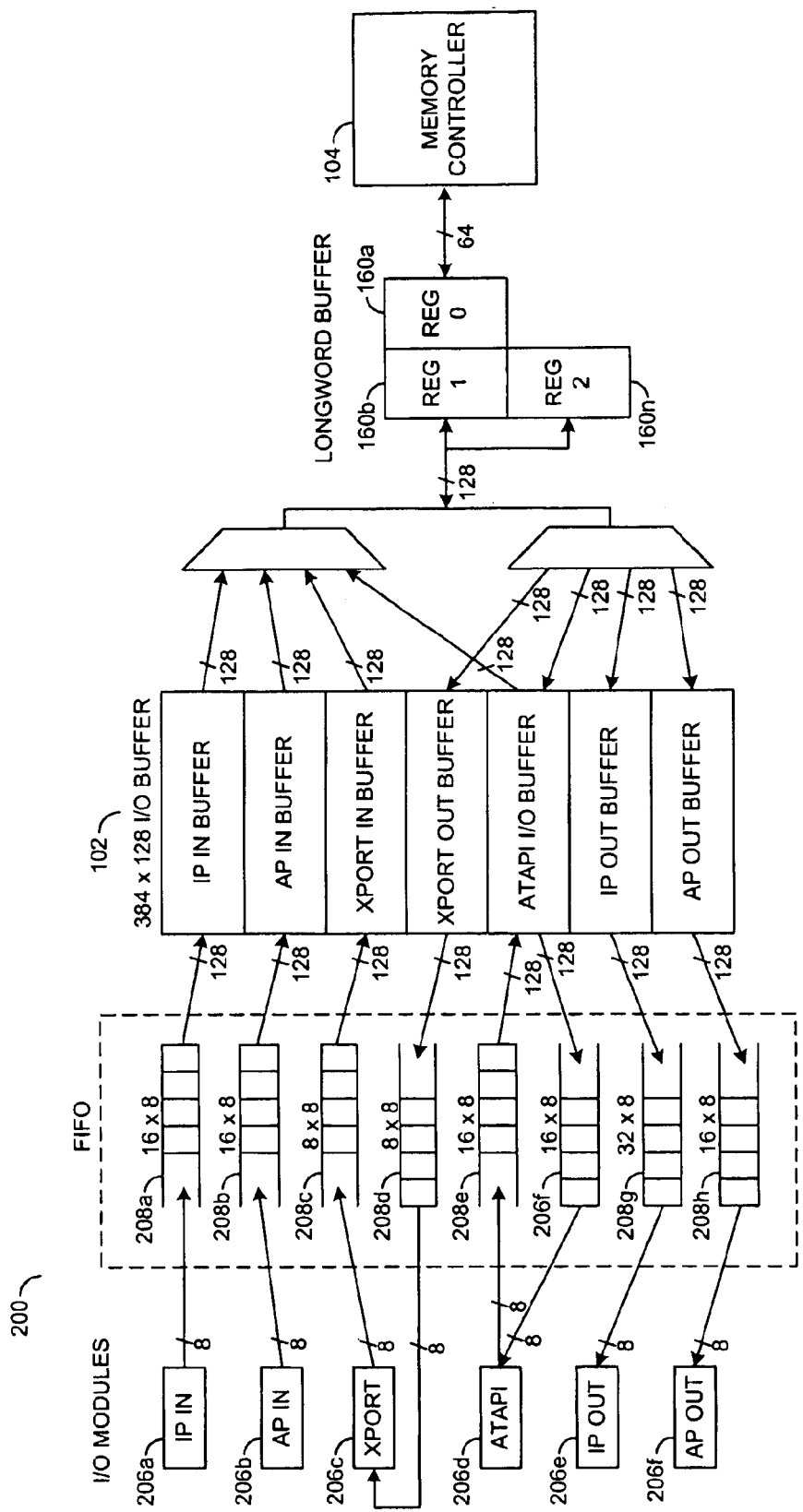
FIG. 6 is a flow diagram illustrating an example data flow path in accordance with a preferred embodiment of the present invention.

Referring to FIG. 6, a flow diagram 200 illustrating an example operation in accordance with a preferred embodiment of the present invention is shown. The memory 102 may be implemented as a 384×128-bit I/O buffer. In an example application, the memory 102 may be configured as seven buffers (e.g., IP_IN_BUFFER, IP_OUT_BUFFER, AP_IN_BUFFER, AP_OUT_BUFFER, XPORT_IN_BUFFER, XPORT_OUT_BUFFER and ATAPI_I/O_BUFFER). However, other numbers of buffers may be implemented accordingly to meet the design criteria of a particular application. The buffers may be implemented, in one example, as distinct address ranges within the memory 102. A number of I/O modules 206a–206d (e.g., IP_IN, AP_IN, XPORT and ATAPI) may be configured to present data to respective FIFOs 208a–208d. An output of the FIFOs 208a–208d may be directed to the respective address ranges in the memory 102. A number of I/O modules 206c–206f (e.g., XPORT, ATAPI, IP_OUT and AP_OUT) may receive data from respective FIFOs 208e–208h. The FIFOs 208e–208h are generally filled with data transferred from the respective address ranges in the memory 102.

Data from the buffers IP_IN_BUFFER, AP_IN_BUFFER, XPORT_IN_BUFFER, and ATAPI_I/O_BUFFER is generally multiplexed onto input/outputs of a number of registers 160a–160n for transfer to the memory controller 104. Data received by the registers 160a–160n is generally demultiplexed into the buffers IP_OUT_BUFFER, AP_OUT_BUFFER, XPORT_OUT_BUFFER, and ATAPI_I/O_BUFFER for transfer to respective I/O modules. The multiplexing and demultiplexing operations are generally controlled according to a predetermined schedule for each device. For example, the sequencer 184 may be configured to provide control signals to control the multiplexing and demultiplexing operations. The number of devices sharing the DMA channel of the memory controller 104 may be easily increased or decreased by re-apportioning the memory space of the memory 102 and the multiplexing/demultiplexing schedule.

The present invention generally shares a single memory among a number of devices. The present invention may reduce the area occupied by address decoders, sense amplifiers and multiple read/write ports when compared to a conventional architecture where each device has a separate memory. The present invention may balance a trade off between reducing area occupied by memory and interconnects and an increase in corner cases. For example, since each FIFO may have a different data width and may not always be full when an access time is available, the present invention may implement control logic that may determine the amount of data to write to the single port memory 102. Furthermore, by time sharing a single DMA channel among a number of devices, the present invention may reduce the number of interconnects (e.g., address, data and control busses) when compared to a design where each device has a separate DMA channel. The present invention may also replace multiple random access memories (RAMs) of different sizes with a single RAM having an address space partitioned accordingly.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:

a single port memory;

a first circuit configured to transfer data between a plurality of first ports and a second port via said single port memory in response to one or more control signals, wherein said single port memory, said plurality of first ports and said second port are coupled with a bidirectional data bus;

one or more first-in-first-out (FIFO) buffers coupling said bidirectional data bus with said plurality of first ports;

a number N+1 of registers coupling said bidirectional data bus with said second port, where N comprises a ratio of a data width of said bidirectional data bus to a data width of said second port; and a second circuit configured to generate said one or more control signals, wherein (i) said single port memory is time shared among said second port and said plurality of first ports and (ii) said second port comprises a direct memory access (DMA) channel.

2. The apparatus according to claim 1, further comprising a memory controller coupled to said direct memory access (DMA) channel.

3. The apparatus according to claim 1, wherein said registers are configured to transfer data between said single port memory and said second port in response to said one or more control signals.

4. The apparatus according to claim 1, wherein said one or more first-in-first-out (FIFO) buffers are configured to transfer data between said plurality of first ports and said single port memory in response to said one or more control signals.

5. The apparatus according to claim 1, wherein said second circuit comprises a sequencer configured to transfer data between said single port memory and each of said plurality of first ports and said second port according to a predetermined schedule.

6. The apparatus according to claim 1, wherein said second circuit is configured to couple one of said N+1 registers to said second port during each cycle of a system clock and couple all but said one of said N+1 registers to said single port memory every N cycles of said system clock.

7. The apparatus according to claim 1, wherein said single port memory has a data width that is an integer multiple of (i) a data width of each of said first ports and (ii) a data width of said second port.

8. The apparatus according to claim 1, wherein each of said registers has a width equal to a data width of said second port.

9. The apparatus according to claim 1, wherein each of said FIFO buffers has an output data width equal to a data width of said single port memory.

10. The apparatus according to claim 1, wherein said second circuit further comprises a one or more logic circuits each configured to generate one or more address signals and one or more byte enable signals in response to a fill condition of a respective one of said one or more FIFO buffers.

11. The apparatus according to claim 1, wherein said single-port memory comprises a single-port random access memory (RAM).

12. The apparatus according to claim 1, wherein said second port is configured to couple to a memory controller of a computer.

13. The apparatus according to claim 1, wherein each of said first ports comprises a port selected from the group consisting of an input port, an output port, and an input/output port.

14. The apparatus according to claim 1, further comprising a data encoder/decoder (CODEC) circuit coupled to said second port.

15. The apparatus according to claim 1, wherein:
said second circuit comprises (i) one or more first logic circuits each configured to control a transfer of data between a respective one of said one or more FIFO buffers and said single port memory in response to said one or more control signals, (ii) a second logic circuit configured to control a transfer of data between said registers and said single port memory in response to said one or more control signals and (iii) a third logic circuit configured to generate said one or more control signals according to a predetermined schedule.

16. The apparatus according to claim 1, wherein said single port memory comprises a first-in-first-out (FIFO) memory.

17. The apparatus according to claim 1, wherein:
each of said one or more FIFO buffers has a first input/output coupled to one of said plurality of first ports and a second input/output coupled to said bidirectional data bus and (ii) each of said registers has a first input/output coupled to said second port and a second input/output multiplexed to said bidirectional data bus.

18. The apparatus according to claim 17, wherein (i) said first input/output of said one or more FIFO buffers has a first data width, (ii) said second input/output of said one or more FIFO buffers has a second data width and (iii) said first data width is smaller than said second data width.

19. An apparatus comprising:
means for transferring data between a plurality of first ports and a second port via a single port memory in response to one or more control signals, wherein (i) said second port comprises a direct memory access (DMA) channel, (ii) said single port memory, said plurality of first ports and said second port are coupled with a bidirectional data bus, (iii) said plurality of first ports are coupled to said bidirectional data bus via one or more first-in-first-out (FIFO) buffers and (iv) said second port is coupled to said bidirectional data bus via a number N+1 of registers, where N comprises a ratio of a data width of said bidirectional data bus to a data width of said second port; and means for generating said one or more control signals in response to a system clock.

20. A method for transferring data between a plurality of ports and a direct memory access (DMA) channel via a single port memory comprising steps of:
transferring data between a plurality of first ports and a second port comprising a direct memory access (DMA) channel via a single port memory in response to one or more control signals, wherein said single port memory, said plurality of first ports and said second port are coupled with a bidirectional data bus;

coupling said plurality of first ports to said bidirectional data bus via one or more first-in-first-out (FIFO) buffers;

coupling said second port to said bidirectional data bus via a number N+1 of registers, where N comprises a ratio of a data width of said bidirectional data bus to a data width of said second port; and generating said one or more control signals in response to a system clock.

21. The method according to claim 20, wherein transferring data between said plurality of first ports and said single port memory comprises:
receiving input data from a device over a plurality of cycles and writing said input data to said single port memory during a single cycle; and retrieving output data from said single port memory during a single cycle and transmitting said output data to a device over a plurality of cycles.

22. The method according to claim 20, wherein transferring data between said second port and said single port memory comprises:

transferring data between all but one of said registers and said single port memory during one of a predetermined number of cycles; and transferring data between said second port and one of said registers during each of said predetermined number of cycles.

23. The method according to claim 20, wherein said one or more control signals are generated according to a predetermined schedule configured to time share said single port memory among said second port and said plurality of first ports.

* * * * *